(12) United States Patent
Ericson et al.

(10) Patent No.: US 7,317,746 B2
(45) Date of Patent: Jan. 8, 2008

(54) METHOD AND DEVICE FOR PASSIVE ALIGNMENT

(75) Inventors: Thomas Ericson, Hägersten (SE); Paul Eriksen, Tyresö (SE); Mats Granberg, Spånga (SE); Krister Fröjd, Älvsjö (SE); Göran Palmskog, Järfälla (SE); Pontus Lundström, Saltsjö-Boo (SE); Lennart Bäcklin, Stockholm (SE); Christian Vjeider, Sollentuna (SE); Paul Asger Eriksen, Skogsvīgen (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 11/177,493

(22) Filed: Jul. 11, 2005

(65) Prior Publication Data

US 2006/0007972 A1 Jan. 12, 2006

Related U.S. Application Data

(63) Continuation of application No. 09/862,461, filed on May 23, 2001, now abandoned.

(30) Foreign Application Priority Data

May 23, 2000 (SE) .................................. 0001954-7
Feb. 6, 2001 (SE) .................................. 0100367-2

(51) Int. Cl.
*H01S 3/08* (2006.01)
(52) U.S. Cl. ............................. 372/107; 372/64; 385/59
(58) Field of Classification Search ................. 372/107
See application file for complete search history.

(56) References Cited

U.S. PATENT DOCUMENTS 5,984,534 A * 11/1999 Elderstig et al. .............. 385/90

OTHER PUBLICATIONS

Takaya et al. (Technical article: An easily-assembled optical device for coupling single-mode planar waveguides to a fiber array, 1996 technical digest series, vol. 6, p. 561-4).*
W. Hunziker et al., "Low Cost Packaging of Semiconductor Laser Arrays Using Passive Self-Aligned Flip-Chip Technique on Si Motherboard"; Proceedings of the 46th Electronic Components & Technology Conference, Orlando, FL, 1996, p. 8-12.
G. Palmskog et al., "Low-Cost Single-Mode Optical Passive Coupler Devices—with an MT-Interface—Based on Polymeric Waveguides in BCB": Proceedings, ECIO 1997, 8TH European Conference on Integrated Optics and Technical Exhibition. Opt. Soc. America, Washington, D.C., USA, 1997, p. 291-294.
P. Lundstrom et al.; "Precision Molding of Plastic Connectors Directly on Single-Mode Fibers"; Proceedings of the 48th Electronic Components & Technology Conference, Seattle, Washington, 1998, p. 828-833.
H. Yokosuka et al.: Multifiber Optical Components for Subscriber Networks; Proceedings of the 46th Electronic Components & Technology Conference, Orlando, FL, 1996, p. 487-493.
H. Åhilfeldt et al.: "Passive Alignment of Laser Arrays to Single-Mode Fibers Using Microstructured Silicon Carriers". Proceedings of the International Conference on Optical MEMS and Their Application, Nara, Japan, 1997, p. 155-159.

* cited by examiner

*Primary Examiner*—Dung (Michael) T. Nguyen
(74) *Attorney, Agent, or Firm*—Buchanan Ingersoll & Rooney, PC

(57) ABSTRACT

The present invention is related to a method and device for precision and passive alignment such as precision and passive alignment technology for low cost array fibre access components. A laser carrier is passively aligned to an MT-interface using alignment structures on a replicated carrier. The laser carrier is based on a self-aligned semiconductor laser, flip-chip mounted on a silicon substrate with planar polymeric waveguides.

9 Claims, 1 Drawing Sheet

METHOD AND DEVICE FOR PASSIVE ALIGNMENT

This application is a continuation of U.S. application Ser. No. 09/862,461 filed 23 May 2001 now abandoned, which claims priority to: Swedish Application No. 0001954-7 filed in Sweden on 23 May 2000; and Swedish Application No. 0100367-2 filed in Sweden on 06 Feb. 2001. The entire contents of U.S. application Ser. No. 09/862,461, Swedish Application No. 0001954-7, and Swedish Application No. 0100367-2 are hereby incorporated by reference.

TECHNICAL FIELD OF THE INVENTION

The present invention is related to a method and a device for precision and passive alignment such as a precision and passive alignment technology for low cost array fibre access components.

BACKGROUND OF THE INVENTION

A combination of microstructure technologies for silicon and polymer has been used to fabricate benzocyclobutene (BCB) waveguide FTTH array components with an MT-interface. Passive alignment structures have been used for both laser arrays, diodes and optical interfaces.

SUMMARY OF THE INVENTION

The broad band society demands substantially increased capacity in the telecommunication network. Today there is an unacceptable high cost for the components in the deployment of the optical single mode fibre to the end user. To reduce the cost the efforts has to be focused on array technology, passive alignment and plastic encapsulation.

The following technologies in a defined combination and sequence are the prerequisite to realize the low cost FTTH component described in hereinafter: Silicon micromachining, indiumphosfide (InP) laser diode array technology, benzocyclobutene (BCB) waveguides, passive alignments of laserdiode arrays to waveguides by self-aligning solder bumps, passive alignment of waveguide to an optical MT interface—micro replication technology and plastic encapsulation.

A laser carrier is passive aligned to an MT-interface using alignments structures on a low cost replicated carrier. The laser carrier is based on a self-aligned semiconductor laser, flip-chip mounted on a silicon substrate with planar polymeric waveguides. The concept for alignment according to the invention is shown in FIG. 1 with a front view of a laser carrier mounted on a polymeric carrier.

The novel concept for a low cost array laser component has thus been evaluated. It may be built on a passive alignment technology between a laser and a waveguide and between waveguides and an optical MT interface. It is feasible that the found process and the found process sequence will make it possible in the future to work and to meet the requirements for manufacturing cost effective commercial components with good optical properties.

The invention will now be described in more detail with reference to a preferred embodiment therof and also to the accompanying drawings.

DETAILED DESCRIPTION OF A PREFERRED EMBODIMENT

Figure 2:
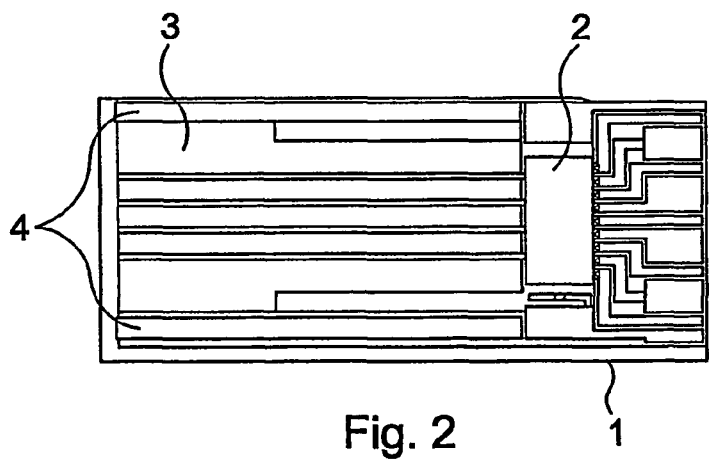
FIG. 2 is a top view of a laser carrier with alignment trenches adapted for the carrier structure according to the invention.

A laser carrier 1 comprises an edge-emitting SM laser array 2 passive aligned to the waveguides 3 on the carrier using AuSn soldering bumps, se FIG. 2. This method of alignment has earlier been shown to give single mode precision, see reference /1/ and /2/. The alignment is achieved by the surface tension that is created of the bumps in the melted phase. The planar waveguides 3 of for example BCB, see reference /3/, on the silicon substrate conduct the light from the laser array 2 to the edge of the carrier 1, enabling a laser component without pigtail connection and with future waveguide functionality to be integrated. For aligning the carrier 1 to an MT-interface alignment trenches 4 are etched, see FIG. 2, into the outer parts of the carrier 1 preferably made by silicon.

Figure 1:
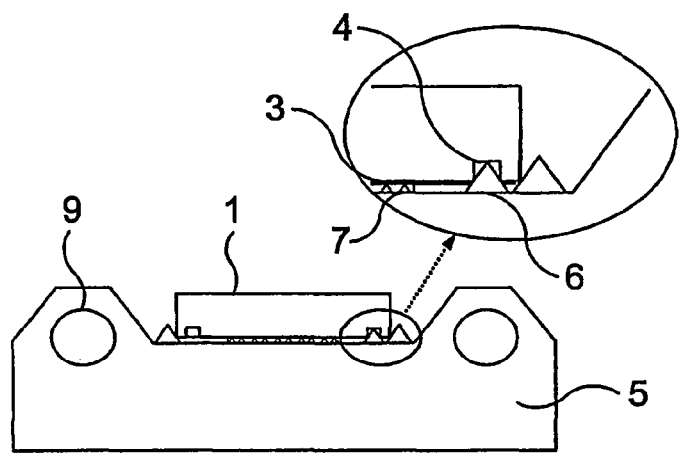
FIG. 1 is a front view of a laser carrier mounted on a polymeric carrier with the concept of an alignment according to the invention.
Figure 3:
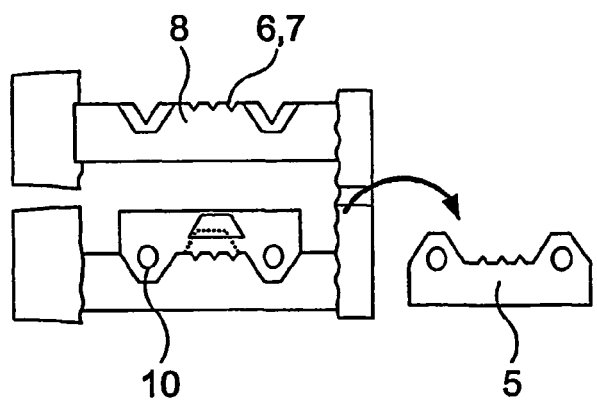
FIG. 3 is a front view of the polymer carrier according to the invention showing alignment structures in a mould insert and the formed polymeric carrier.

The laser carrier 1 is then placed upside down on a polymeric carrier 5 and passively positioned to an MT-interface by fitting the alignment trenches 4 on the laser carrier to vertical alignment structures 6 and the waveguides 3 to horizontal alignment structures 7 on the polymeric carrier, see FIG. 1. Polymeric carriers are preferably made by using replication technique, based on transfer moulding with micro structured silicon as a mould insert 8, see FIG. 3 and reference /4/. The mould insert comprises v-grooves of different sizes for the MT-interface, the vertical alignment and the horizontal alignment for later creating the vertical alignment structures 6 and the horizontal alignment structures 7 in the polymeric carrier. In order to make room for the laser array a cavity can be formed behind the alignment structures in the polymeric carrier. This is preferably done using a bonded building block on the mould insert. Quartz filled epoxy is used as polymer in order to achieve dimensional control and low thermal expansion of the replicated structures, see reference /4/ and /5/. MT guiding holes 9 in the replicated carriers, see FIG. 1, are made by placing the MT-guiding pins 10 on the mould insert during the replication step.

A lead frame may then be mounted on the backside of the laser carier and connected to the electrodes by wire bonding. This is done before the laser carrier is fixed to the polymer carrier by gluing. Finally, this package is encapsulated using transfer moulding and polished to achieve optical finish at the waveguide edge.

The laser array can have four laser channels, where signal electrodes can apear on the epitaxial side and be connected to the carrier when the laser array is flip-chip mounted. The common ground electrode is wire bonded to the laser carrier.

The laser carrier was manufacturated using standard micro structuring technique with litography and dry etching on silicon. Electrodes were made by e-beam evaporation of Ti/Pt/Ni/Au and a lift-off technique. Gold and tin can then be electroplated through a photoresist mask as soldering bumps. The planar BCB waveguide was built up by under- and overcladding layers, and in between a waveguiding core, se reference /3/. All these layers were deposited on the silsicon substrate by spinning deposition and the pattern of the waveguiding core was made in a lithography step. The end surface of the waveguide was also dry etched, thus creating a sharp edge of the waveguide. This was done in order to get good coupling efficiency from the laser into the waveguide core. Finally, alignment trenches were etched into the substrate using DRIE (Deep Reactive Ion Etching) with oxide as masking material.

Silicon wafers of (100) orientation was anisotropically etched in KOM (30 vol. %), for manufacturing the mould insert. Since the v-grooves for the MT-guiding pins consists of two levels, two separate litography steps were used with Si oxide and Si nitride as masking material. First the wider MT-structures were etched with nitride as masking material. After removing the nitride, the rest of the structures were etched with an underlying oxide mask. In order to create the building block, another silcon wafer was fusion bonded on top of this wafer. The building block structures were then etched out from this bonded wafer. All structures in the mould insert were compensated for a dimensional shrinkage of 0.629% of the polymeric material, see reference /4/.

The optical properties of the laser module can be tested with an integrating sphere and the IP-curve can be recorded for each individual channel.

The total shrinkage of the replicated structures after the transfer moulding was found to be about 0.69% when measuring the structures on both mold insert and replicated carrier with a profilometer.

It will be understood that the invention is not restricted to the aforedescribed and illustrated exemplifying embodiment thereof, and that modificatons can be made within the scope of the following claims.

REFERENCES

/1/ Åhlfeldt H, et al, "Passive alignment of laser arrays to single-mode fibers using microstructured silcon carriers", Proc. of the Int. Conf. on Optical MEMS and their application (MOEMS '97), Nara, Japan, 1997, p. 155-159.

/2/ Hunziker W., et al, "Low cost Packaging of Semiconductor Laser Arrays using Passive Self-Aligned Flip-Chip Technique on Si motherboard", Proc. of the 46$^{th}$ Electronic Components & Technology Conference, Orlando, Fla., 1996, p. 8-12.

/3/ Palmskog G., et al, "Low-cost single-mode optical passive coupler devices with an MT-interface-based on polymeric waveguides in BCB", Proc, ECIO '97. 8$^{th}$ European Conference on Integrated Optics and Technical Exhibition. Opt. Soc. America, Washington, D.C. USA, 1997, p. 291-294.

/4/ Lundström, P, et al, "Precision Molding of Plastic Connectors Directly on Single-Mode Fibers", Proc. 48$^{th}$ Electronic Components & Technology Conference, Seattle, Wash., 1998, p. 828-833.

/5/ Yokosuka H., et al, "multifiber Optical Components for Subscriber Networks", Proc. of the 46$^{th}$ Electronic Components & Technology Conference, Orlando, Fla., 1996, p. 487-493.

The invention claimed is:

1. A method for precision passive alignment for a low cost array access component, comprising the steps of:
   forming alignment trenches in a laser carrier having waveguides;
   flip-chip mounting a laser array to the laser carrier:
   forming vertical alignment structures and horizontal alignment structures on a first portion of a polymeric carrier;
   forming a cavity on a second portion of the polymeric carrier that is adjacent to the first portion; and
   placing the laser carrier on the polymeric carrier,
   wherein the placing step includes mating the alignment trenches of the laser carrier with the vertical alignment structures of the polymeric carrier, and aligning the waveguides of the laser carrier to the horizontal structures of the polymeric carrier, and mating the laser array of the laser carrier with the cavity of the polymeric carrier such that the laser array is seated within the cavity.

2. The method according to claim 1, further comprising the step of:
   forming the vertical alignment structures in a lengthwise direction along opposite edges of the first portion of the polymeric carrier.

3. The method according to claim 1, further comprising the step of:
   forming the horizontal alignment structure on the first portion of the polymeric carrier in an area that is between the vertical alignment structures.

4. A device for precision passive alignment for low cost array fiber access component, the device comprising:
   a laser carrier having waveguides, alignment trenches, and a laser array, wherein the laser array is flip-chip mounted to the laser carrier;
   a polymeric carrier having vertical alignment structures and horizontal alignment structures formed on a first portion, and a cavity formed on a second portion,
   wherein the alignment trenches of the laser carrier mate with the vertical alignment structures of the polymeric carrier, and the waveguides of the laser carrier are aligned to the horizontal alignment structures of the polymeric carrier when the laser carrier is placed on the polymeric carrier, the laser array being seated in the cavity of the polymeric carrier when the laser carrier is placed on the polymeric carrier.

5. The device according to claim 4, wherein the vertical alignment structures are formed in a lengthwise direction along opposite edges of a first portion of the polymeric carrier.

6. The device according to claim 4, wherein the horizontal alignment structures are formed on the first portion of the polymeric carrier in an area that is between the vertical alignment structures.

7. A device comprising:
   a laser carrier having alignment trenches;
   waveguides mounted on the laser carrier;
   a laser array flip-chip mounted to the laser carrier; and
   a polymeric carrier having vertical alignment structures and horizontal alignment structures formed on a first portion, and a cavity formed on a second portion that is adiacent to the first portion,
   wherein the alignment trenches of the laser carrier mate with the vertical alignment structures of the polymeric carrier, the waveguides of the laser carrier are aligned to the horizontal alignment structures of the polymeric carrier, and the laser array of the laser carrier is seated within the cavity of the polymeric carrier when the laser carrier is placed on the polymeric carrier.

8. The device according to claim 7, wherein the vertical alignment structures of the laser carrier are formed in a lengthwise direction along opposite edges of a first portion of the polymeric carrier.

9. The device according to claim 7, wherein the horizontal alignment structures of the polymeric carrier are formed on the first portion of the polymeric carrier in an area that is between the vertical alignment structures of the polymeric carrier.

* * * * *

UNITED STATES PATENT AND TRADEMARK OFFICE
CERTIFICATE OF CORRECTION

| | | |
|---|---|---|
| PATENT NO. | : 7,317,746 B2 | Page 1 of 1 |
| APPLICATION NO. | : 11/177493 | |
| DATED | : January 8, 2008 | |
| INVENTOR(S) | : Ericson et al. | |

It is certified that error appears in the above-identified patent and that said Letters Patent is hereby corrected as shown below:

In Column 2, Line 46, delete "carier" and insert -- carrier --, therefor.

In Column 2, Line 62, delete "silsicon" and insert -- silicon --, therefor.

In Column 3, Line 10, delete "silcon" and insert -- silicon --, therefor.

In Column 3, Line 30, delete "silcon" and insert -- silicon --, therefor.

In Column 4, Line 48, in Claim 7, delete "adiacent" and insert -- adjacent --, therefor.

Signed and Sealed this

Thirtieth Day of September, 2008

JON W. DUDAS
*Director of the United States Patent and Trademark Office*